(12) United States Patent  
Best et al.

(10) Patent No.: US 8,312,430 B2
(45) Date of Patent: Nov. 13, 2012

(54) GUARDING CODE CHECK-IN WITH TEST CASE EXECUTION RESULTS

(75) Inventors: Debora O'Berry Best, Acton, MA (US); Steven Francis Best, Acton, MA (US); Robert James Eggers, Jr., Austin, TX (US); Janice Marie Girouard, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1111 days.

(21) Appl. No.: 12/199,330

(22) Filed: Aug. 27, 2008

(65) Prior Publication Data

US 2010/0058294 A1   Mar. 4, 2010

(51) Int. Cl.
*G06F 9/44* (2006.01)

(52) U.S. Cl. .......................... 717/122; 717/120

(58) Field of Classification Search .............. 717/122, 717/120

See application file for complete search history.

(56) References Cited

U.S. PATENT DOCUMENTS

| | | | |
|---|---|---|---|
| 5,706,510 A | 1/1998 | Burgoon | |
| 5,806,078 A | 9/1998 | Hug et al. | |
| 6,601,018 B1 * | 7/2003 | Logan | 717/124 |
| 7,260,818 B1 | 8/2007 | Iterum et al. | |
| 7,653,893 B2 * | 1/2010 | Neumann et al. | 717/120 |
| 2006/0041440 A1 | 2/2006 | Cheng et al. | |
| 2006/0101443 A1 | 5/2006 | Nasr et al. | |
| 2006/0200803 A1 | 9/2006 | Neumann et al. | |

OTHER PUBLICATIONS

Canfora, et al. "Identifying Changed Source Code Lines from Version Repositories", 2007, IEEE, p. 1-8.*
Singh et al., "Improving Agile Software Development using eXtreme AOCE and aspect-Oriented CVS", Proceedings of the 12th Asia-Pacific Software engineering Conference (APSEC'05), IEEE 2005, pp. 1-8.
"Using HP System Software manager for the mass deployment of software updates to client PCs", Mar. 2004, Hewlett-Packard Development Company, L.P., pp. 1-12.

* cited by examiner

*Primary Examiner* — Qamrun Nahar
(74) *Attorney, Agent, or Firm* — Yee & Associates, P.C.; Steven L. Bennett

(57) ABSTRACT

A mechanism for providing a source code control system that employs test case execution results to mandate that software code have a specific level of quality for check-in to a central repository. A request to check-in a modified copy of a source code file to a repository is received, wherein the modified copy comprises changes to the source code file located in the repository. The modified copy of the source code file is placed in a quality check pending state in the repository. Responsive to an occurrence of a specific event or expiration of a set time period, applicable regression test cases are executed against the changes in the modified copy. A determination is made as to whether the regression test cases are successful. If the regression test cases are successful, the changes in the modified copy are committed to the source code file located in the repository.

20 Claims, 3 Drawing Sheets

GUARDING CODE CHECK-IN WITH TEST CASE EXECUTION RESULTS

BACKGROUND OF THE INVENTION

1. Field of the Invention

The present invention relates generally to an improved data processing system, and more specifically to providing a source code control system that employs test case execution results to mandate that software code have a specific level of quality for check-in to a central repository.

2. Description of the Related Art

In the field of software development, a project may move through multiple cycles in which code is developed, debugged, and delivered for production. A project may also need to be maintained and enhanced past the delivery stage, and may be released multiple times in different versions. To monitor the evolution of code through the development process, a code management system may be used to track all development work and code changes in a set of files and allow a team of developers to collaborate by sharing control of different versions of the source files in a central repository.

One example of a code management system is the Concurrent Versions System (CVS). CVS is a tool that is enables asynchronous collaboration on projects. CVS maintains a history of all versions of the project at each point in the development in a central repository. Users may upload or commit their files to the central repository and download the files onto their local computer for editing. For example, when a source code file is registered with the code management system, a client may download or "check-out" a copy of the source code file onto their local computer from the central repository of the code management system. Once the client is finished editing the file, the client may upload or "check-in" the changes to the edited source file to the central repository of the code management system. If the check-in operation is successful, the code management system commits these changes to the source code file in the central repository. A commit in the context of a code management system refers to submitting the latest changes of the source code to the central repository, wherein these changes are made a part of the head source code file in the repository. A head source code file is the latest revision of the source code in the central repository. The version numbers of all files involved with the changes automatically increment, and the code management system writes various data to its log files, including user-supplied description information (e.g., comments explaining the changes that were made), the date, and the code author's name. If a commit of a source code file has been performed, a client may still rollback the source code changes committed to the central repository by retrieving a copy of a previous version of the source code file from the central repository.

BRIEF SUMMARY OF THE INVENTION

The illustrative embodiments provide a mechanism for providing a source code control system that employs test case execution results to mandate that software code have a specific level of quality for check-in to a central repository. A request to check-in a modified copy of a source code file to a repository is received, wherein the modified copy comprises changes to the source code file located in the repository. The modified copy of the source code file is placed in a quality check pending state in the repository. Responsive to an occurrence of a specific event or expiration of a set time period, applicable regression test cases are executed against the changes in the modified copy. A determination is made as to whether the regression test cases are successful. If the regression test cases are successful, the changes in the modified copy are committed to the source code file located in the repository.

DETAILED DESCRIPTION OF THE INVENTION

Figure 1:
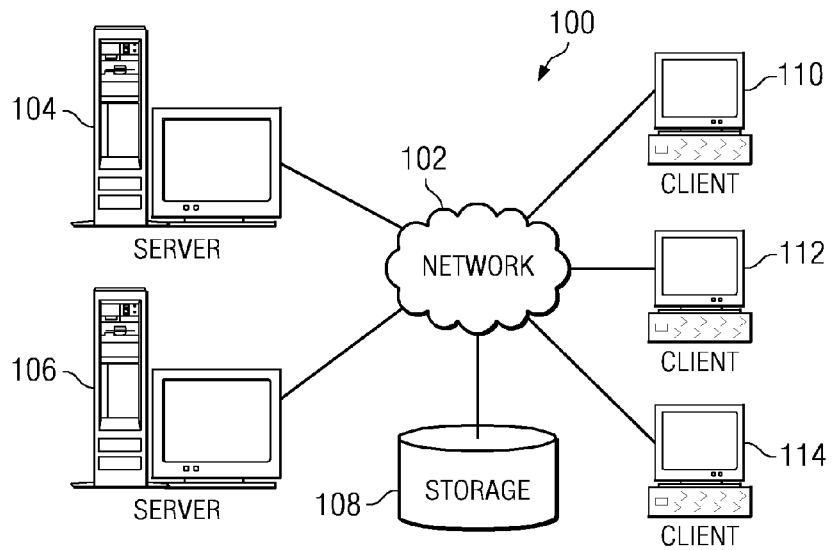
FIG. 1 depicts a pictorial representation of a distributed data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
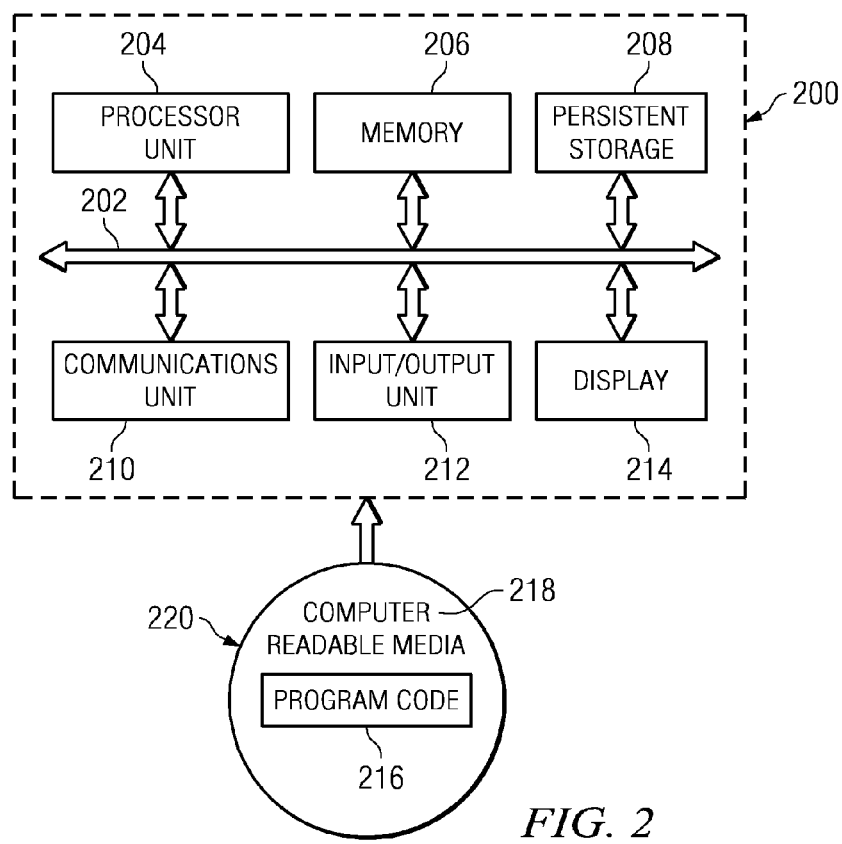
FIG. 2 is a block diagram of an exemplary data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form. In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 206 or a cache such as found in an interface and memory controller hub that may be present in communications fabric 202.

A software build comprises a compilation process in which source code files are converted into executable code. In the software development field today, it is not unusual for very large software development projects (e.g., Advanced Interactive Executive™ (AIX®), Lotus Notes®, Microsoft Outlook®, WebSphere®, among others) to experience difficulties during the software build process. These large projects may often continue for days (or sometimes even weeks) between project builds that have no regression failures. Regression testing is the process of repeating tests that have already run successfully and comparing the new results with the earlier valid results. As the project moves ahead and acquires new or rewritten code, one or more additional tests are run, debugged, and rerun until the project successfully passes the tests. If there is a malfunction or failure in one of the regression tests, a developer may determine that the malfunction resulted from code changes made since the last test run.

As previously mentioned, a code management system is used to track code changes in a set of files and allow developers to collaborate by sharing control of different versions of the source files in a central repository. A client may download or "check-out" a copy of a source file from the central repository, and later upload or "check-in" the changes made to the copy to the central repository. There are currently two steps to finalize a code change—"check-in" and "commit". The check-in operation comprises placing the code changes in a library. If the check-in operation is determined to be valid, the commit operation then commits these changes to the source code file in the central repository (i.e., makes the changes a part of the product or finalizes the changes). A problem with existing processes in the current art is that these check-in and commit processes are performed manually. In addition, existing code management tools allow developers to check-in code into the central repository without mandating a specific level of code quality. Taking into consideration the high complexity and component interdependencies large software development projects usually have, by not requiring a specific level of code quality in the code check-in, it can be difficult for these large software development projects to achieve successful build processes due to unacceptable code being committed to the repository.

The illustrative embodiments address this problem by providing an enhancement to existing code management tools (e.g., CVS) which allows for automatically controlling the state of the code check-in process and testing the code quality. The mechanism of the illustrative embodiments requires that a developer provide a specific level of code quality when uploading code to the code management system, thereby increasing the ability of a software development project to achieve successful build processes. In addition, by mandating a specific level of code quality be checked-in to the code management system for a project, the mechanism of the illustrative embodiments provides developers with early feedback on their work.

To implement the aspects of the illustrative embodiments, the mechanism of the illustrative embodiments introduces a "quality check pending" state in the check-in process. The quality check pending state is a state in the check-in process in which edited code submitted to the code management system is automatically tested until the quality of the pending code may be verified. The edited code remains in the quality check pending state to ensure the code meets a minimum level of acceptable code quality before being committed to the central repository of the project. When an edited copy of source code is checked into the code management system, the edited copy of source code is automatically placed in the central repository in the quality check pending state. Upon the occurrence of a defined event or the expiration of a set time period, the edited copy of source code (and other pending software code changes) is automatically pulled into a software delivery (build) environment. Within the software delivery environment, a build process is automatically performed and appropriate regression test buckets are automatically triggered for the quality check pending code. The regression test buckets are used to run appropriate regression tests on the quality check pending code prior to the code being checked-in (committed) to the central repository. If the test case is not executed successfully, the edited code is not committed to the central repository, not included in any build, nor is it given to any subsequent developer when they checkout code. If the test case is executed successfully (i.e., the code meets a specific level of quality), the software delivery environment notifies the code management system that the check-in process of the edited copy of source code is allowed to complete. The edited copy of source code may then be automatically committed to the central repository.

Figure 3:
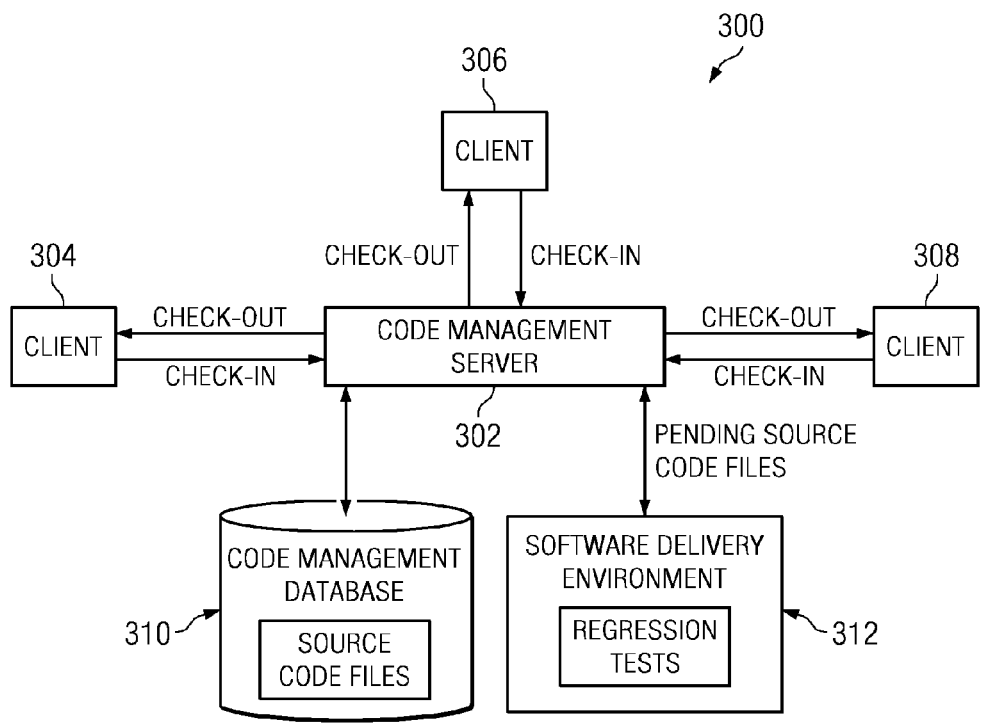
FIG. 3 is a block diagram of an exemplary code management system with which the illustrative embodiments may be implemented.

FIG. 3 is a block diagram of an exemplary code management system with which the illustrative embodiments may be implemented. Code management system 300 may be implemented in a distributed computing environment, such as network data processing system 100 in FIG. 1. In this illustrative example, code management system 300 comprises code management system server 302, clients 304, 306, and 308, and code management database 310. Code management system 300 may include additional clients and other devices not shown.

Code management server 302 keeps track of the source code files sorted into directories in the code management database 310. Code management server 302 records the changes to the source files over time and maintains a version history of these files. Code management database 310 is a central repository which stores master copies of the source files and revision histories for a project. Each project has one code management database. Developers at clients 304, 306, and 308 may request personal working copies of the source code files from code management server 302. A developer's personal working copy is the local source code file copy in which the developer may make changes to the project. The developer "checks-out" a personal working copy of a source code file from the code management system server. The process of checking-out a file comprises retrieving a copy of the requested file from the code management database and storing the working copy to a local directory of files. The developer may then edit the personal working copy in the developer's local directory. Each developer may request their own personal working copy from the code management database. Consequently, a developer may make changes to the developer's own working copy independently from other working copies checked-out by other developers.

Figure 4:
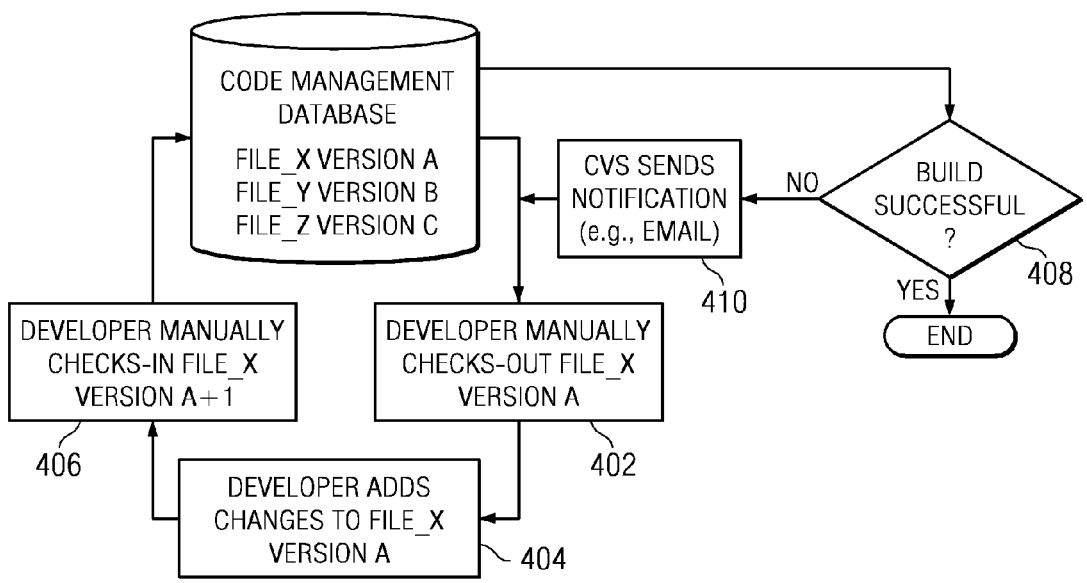
FIG. 4 is a flowchart of a known process for downloading and uploading source code files in a code management system.

Upon completing changes to the developer's personal working copy, the developer then "checks-in" this working copy to code management server 302. In existing code management systems, the process of checking-in a file copy to the code management server consists of the developer providing the edited working copy to the code management server. If the code management server determines the check-in operation is valid, the edited working copy may then be committed to the code management database. A commit in this context refers to submitting the latest changes of the source code to the central repository and making these changes a permanent part of the head source code file revision in the repository. A revision in this context refers to a committed change in the history of a file or set of files. Thus, in existing code management systems (and as illustrated in FIG. 4), upon the developer checking-in an edited working copy of a source file, the code management server commits the edited working copy to the code management database by incorporating these changes permanently into the master copy of the source file in the database. Thus, existing code management tools do not require that code being checked-in meet a specific level of code quality.

In contrast, with the mechanism in the illustrative embodiments, when a developer finishes editing the working copy and checks-in the copy to code management server 302, code management server 302 places the edited copy in a "quality check pending" state. The pending software changes are placed in code management database 310 separate from the base code of the project. Upon the occurrence of a defined event or the expiration of a set time period (e.g., 1 hour, 24 hours, or until a particular time of day), pending software code changes in code management server 302 are pulled into software delivery environment 312. Software delivery environment 312 comprises a build mechanism that converts source code files into executable code and a regression test mechanism that tests the software code to identify regression bugs. Regression bugs occur whenever software functionality that previously worked as desired stops working or no longer works in the same way that was previously planned (usually as a unintended consequence of software code changes).

Within software delivery environment 312, a regression test bucket is automatically applied to the pending code. The regression test bucket comprises appropriate test cases which are executed against the pending code to ensure the pending code meets a minimum level of code quality. When all of the relevant test cases have successfully executed against the pending code, software delivery environment 312 notifies code management system 302 that the check-in process of the pending code may complete. Subsequently, code management server 302 may then permanently commit the pending code to the code base in code management database 310.

However, if the regression testing of any one of the pending code files results in a failure, code management server 302 may retry the regression test cases. In one embodiment, code management server 302 may use a technique such as a binary search algorithm to locate the offending software code change which causes the build to break. For example, if there are 12 changes in the batch of pending code, the binary search algorithm may divide the code changes into two groups, and then re-run the regression tests against each of the groups. If the regression tests are successful against the first code change group, the offending code change is determined to be located in the second code change groups. Code management server 302 may continue to employ the binary search algorithm in this manner until the particular offending code change is identified. Likewise, if the regression tests are not successful against the initial batch of code, the offending code change is determined to be located in the tested code change group. Code management server 302 continues to use the binary search algorithm until the particular offending code change is identified in this group. By using a binary search algorithm in this manner, code management server 302 may automatically identify the error-causing culprit without requiring costly manual intervention.

Once the offending change is located, the offending code change is assigned a software bug identifier (ID). Code management server 302 may automatically back out any code in the pending code files that have caused the regression tests to fail. These code changes may be identified and backed out of the pending code files per software bug ID. Since all of the remaining pending code changes successfully passed the test cases, code management server 302 may move these pending code changes out of the quality check pending state and permanently commit the pending code changes to the code base in code management database 310.

FIG. 4 is a flowchart of a known process for downloading and uploading source files in a code management system. Within the code management system, a central repository comprises the master copies of the source code files for a project. These master copies comprise a project's full revision history. In this illustrative example, the central repository is a code management database comprising several source code files for a project, including File_X (version A of the source code), File_Y (version B of the source code), and File_Z (version C of the source code).

The process begins when a developer sends a request to the code management system to "check-out" a personal working copy of a source code file, such as File_X (version A) (step 402). The developer edits the personal working copy, wherein the edits change the developer's working copy of File_X (version A) into File_X' (version A+1) (step 404). Upon completing changes to the developer's personal working copy, the developer then "checks-in" this working copy to the code management system (step 406).

A software build comprises a compilation process in which source code files are converted into executable code. The build process of the latest version of the source code files may be manually invoked or automated to occur on a specific event or after a certain time period has elapsed. When the build process of the latest version of the source code files in the code management database is performed, the code management system makes a determination as to whether the build is successful (step 408). If the build is successful ('yes' output of step 408), the process terminates thereafter. However, if the build is not successful ('no' output of step 408), the code management system notifies the developer that the build was unsuccessful (step 410). This notification may be made through common bugtracker tools, such as, for example, Bugzilla. If changes to multiple files were made since the last successful build, the developer may determine which of the edited files likely caused the error. The process then returns to step 402, wherein the developer checks-out the offending file. The developer must re-edit the file (step 404) and check-in the re-edited file to the code management database (step 406). The build is repeated again (step 408) until the build process is successful.

Figure 5:
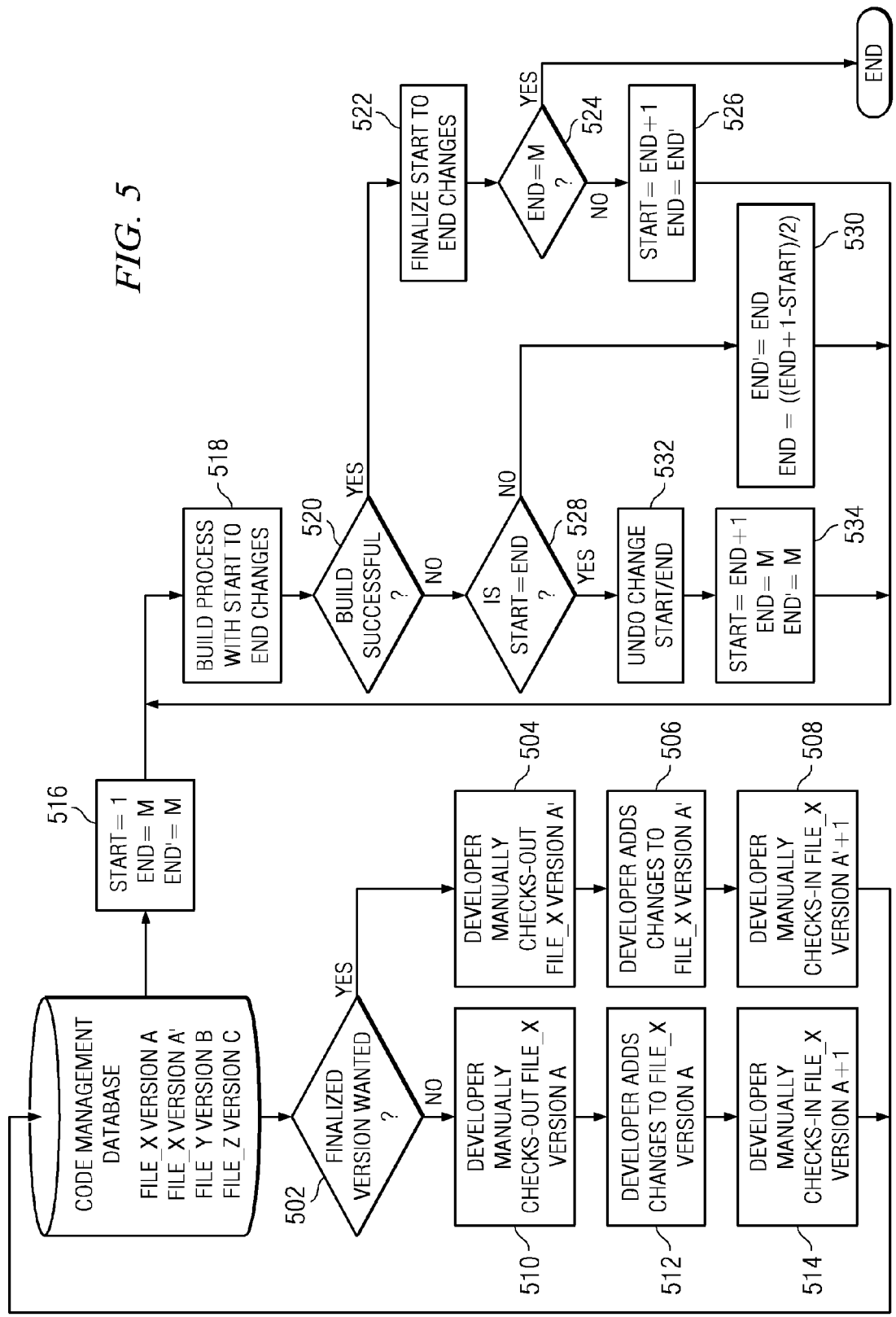
FIG. 5 is a flowchart of an exemplary process for managing source code files in a code management system in accordance with the illustrative embodiments.

FIG. 5 is a flowchart of a process for managing source files in a code management system in accordance with the illustrative embodiments. The process described in FIG. 5 provides an enhancement to existing code management tools by introducing the "quality check pending" state into the code check-in process. Steps 502-514 represent existing code check-in processes, and steps 516-526 represent the quality check pending process in accordance with the illustrative embodiments. As code is checked-in to the code management system, the code is placed in the quality check pending state and a particular regression test bucket may be automatically triggered for the pending code. The code will only be committed to the repository if the test cases are successfully executed. Consequently, the process described in FIG. 5 requires that developers provide a specific level of code quality when uploading code to the code management system.

In this illustrative example, a code management database in the code management system comprises several source code files for a project, including File_X (version A of the source code), File_X (version A' of the source code), File_Y (version B of the source code), and File_Z (version C of the source code). When a developer wants to check-out a working copy of a source code file, such as File_X, if the source code file has multiple versions, the code management system identifies the specific version requested by the developer. In this example check-out process, the code management system determines whether the developer has requested a working copy of the finalized version of File_X (version A') (step 502). If a working copy of the finalized version of File_X (version A') has been requested by the developer ('yes' output of step 502), the code management system allows the developer to check-out a personal working copy of File_X (version A') (step 504). The developer edits the working copy in the developer's local directory, wherein the edits change the working copy of File_X (version A') into File_X (version A'+1) (step 506). Upon completing changes to the developer's personal working copy, the developer then checks-in the working copy of File_X (version A'+1) to the code management database (step 508).

Turning back to step 502, if a working copy of the finalized version of File_X (version A') has not been requested by the developer ('no' output of step 502), the code management system allows the developer to retrieve a copy of a previous version of File_X, or version A (step 510). The developer edits the working copy in the developer's local directory and changes the working copy of File_X (version A) into File_X (version A+1) (step 512). Upon completing changes to the developer's own working copy, the developer then checks-in the working copy of File_X (version A+1) to the code management database (step 514).

In contrast with the process in FIG. 4, the check-in process according the mechanism of the illustrative embodiments comprises having the developer provide the edited working copy to the code management system, and the code management system places the edited working copy of the source code from a developer in a quality check pending state and run regression tests against the pending code while the pending code is in the quality check pending state. Only if the regression tests executed on the pending code are successful will the pending code be committed to the code management database. If the regression tests are not successful, the code management system backs out the pending code and does not commit the pending code to the code management database.

As mentioned previously, an edited working copy of a source file is placed in a quality check pending state. Upon the occurrence of a specific event or the expiration of a set time period, the pending software changes in the code management database are pulled into a software delivery environment. In the software delivery environment, a software build is performed comprising regression tests against the pending code changes. The build process begins by first setting the current Start and End values of the build (step 516). In this example, there are "M" pending code changes. The Start value and End values indicate the range of code changes in the list of code changes against which the build process will be executed (e.g., code changes 1, 2, and 3). End' is the last known endpoint in the failed build sequence (e.g., if code changes 1-3 are tested and the build fails, the last known endpoint failure maximum (End')=3). The build process then begins processing the pending code changes according to the current Start, End, and End' values (e.g., from Start=1 to End=M, End'=M) (step 518).

A determination is then made by the build mechanism as to whether the build process is successful (step 520). If the build process is successful ('yes' output of step 520), the build process finalizes the code changes from the current Start value to the current End value (step 522). The build process finalizes the code changes by committing the changes (i.e., moving the changes out of the pending verification state to a permanently applied state). The build process then determines if the current end code change value equals the total number of pending code changes (End=M) (step 524). If the current end code change value equals the total number of pending code changes ('yes' output of step 524), the process terminates thereafter, since all of the pending code changes have been processed in the build and the build process was successful. However, if the current end code change value does not equal the total number of pending code changes ('no' output of step 524), the build process increments the current start value by 1 (Start=End+1) and sets the current End value to the current End' value (End=End') (step 526). The process then returns to step 518 in which the build process is re-executed for the remaining pending code changes according to the new current Start, End, and End' build values.

Turning back to step 520, if the build process is not successful ('no' output of step 520), the build process makes a determination as to whether the current Start value is equal to the current End value (step 528). If the current Start value is not equal to the current End value ('no' output of step 528), the build process attempts to reduce the number of pending code changes processed in the build in order to locate the offending code changes that caused the build to break. The build process sets the current End value ((End+1−Start)/2), and sets the current End' value to the new End value (step 530). The process then returns to step 518 in which the build process is re-executed with the new current Start, End, and End' values reflecting the reduced number of code changes. The build process may continue to execute and, if unsuccessful, continue to reduce the number of code changes in each build according to step 530 until the offending change is identified.

Turning back to step 528, if the current Start value is equal to the current End value ('yes' output of step 528), the build process has identified the code change that has caused the build to break. The build process may automatically back out any code in the pending code files that have caused the regression tests in the build process to fail. The build process assigns a software bug ID to the offending code change, and the build process then backs out the code change associated with the software bug ID (step 532). The build process then sets the current Start value to End+1, sets the current End value to M, and sets the current End' value to M (step 534). The process then returns to step 518 in which the build process is re-executed with the new current Start, End, and End' values.

A particular example of the software build process in FIG. 5 is shown in Table 1. Table 1 shows the Start, End, and End' values in a software build that processes 12 pending code changes (M=12), where code change 3 in the list of pending code changes breaks the build.

TABLE 1

| Start | End | End' |
|-------|-----|------|
| 1 | 12 | 12 |
| 1 | 6 | 6 |
| 1 | 3 | 3 |
| 1 | 1 | 3 |
| 2 | 3 | 3 |
| 2 | 2 | 3 |
| 3 | 3 | 3 |
| 4 | 12 | 12 |

Initially, the current Start and End values of the build are set to 1 and 12, respectively. End' value is also set to 12. If the build process is successful, the code changes from Start value 1 to the End value 12 are committed to the database. If the End value equals the total number of pending code changes (12 in this example), the process ends since all of the pending code changes have been processed in the build and the build process was successful.

However, if the build process is not successful, one of the 12 code changes has caused the failure. The current End value is consequently reset by reducing the number of pending code changes processed in the build in order to locate the offending code changes that caused the build to break. End value is set to (End+1−Start)/2, or 6 in this example. End' value is also set to the End value of 6. After the build process is re-executed with the new current Start, End, and End' values (1, 6, 6) reflecting the reduced number of code changes, if this build process is successful, the code changes from Start value 1 to End value 6 are committed to the database. If the build process is not successful, one of the 6 code changes has caused the failure. The current End value is then reset to (End+1−Start)/2, or 3. End' value is also set to the End value of 3, and the build process is re-executed with the new current Start, End, and End' values (1, 3, 3).

If, after an unsuccessful build, the current Start value (e.g., Start value 3) is determined to be equal to the current End value (e.g., End value 3), the build process has identified the code change that has caused the build to break. This code change may be backed out of the pending code files. The current Start value is then set to End+1 (4 in this example), sets the current End value to M (12), and sets the current End' value to M (12) in order to process the remaining pending code changes.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automating software code check-in in a code management system, the computer implemented method comprising:
   receiving a request to check-in a modified copy of a source code file to a repository, wherein the modified copy comprises changes to the source code file located in the repository;
   placing the modified copy of the source code file in a quality check pending state in the repository, wherein the quality check pending state is a state in the repository in which the modified copy of the source code is maintained until the quality of the modified copy of the source code file is verified;
   responsive to an occurrence of a specific event or expiration of a set time period, automatically pulling the modified copy of the source code from the repository into a software delivery environment comprising a build mechanism that converts source code files into executable code and a regression test mechanism to execute regression test cases against the changes in the modified copy;
   automatically determining by the software delivery environment if the regression test cases are successful to verify the modified copy; and
   responsive to a determination that the regression test cases are successful, committing the changes in the modified copy to the source code file located in the repository.

2. The computer implemented method of claim 1, further comprising:
   responsive to a determination that the regression test cases are not successful, preventing the modified copy from being committed to the repository.

3. The computer implemented method of claim 1, further comprising:
   responsive to a determination that the regression test cases are not successful, backing out the modified copy from the quality check pending state.

4. The computer implemented method of claim 3, further comprising:
   providing notification that the regression test cases were unsuccessful.

5. The computer implemented method of claim 1, wherein the regression test cases automatically test the modified copy of the source code file to verify the modified copy meets a minimum level of acceptable code quality before being committed to the repository.

6. The computer implemented method of claim 1, wherein placing the modified copy of the source code file in a quality check pending state in the repository further comprises:
   performing a build process on the modified code in the software delivery environment, wherein appropriate regression test buckets are automatically triggered in the build process to test a quality of the modified code.

7. The computer implemented method of claim 1, wherein committing the changes in the modified copy to the source code file located in the repository further comprises:
   moving the modified copy from the quality check pending state to a permanent state in the repository.

8. The computer implemented method of claim 1, further comprising:
responsive to a determination that the regression test cases are not successful, separating the changes in the modified copy into change sub groups;
re-executing the regression test cases on each separate change sub group; and
responsive to a determination that the re-executed regression test cases are unsuccessful against a change sub group, iteratively performing the separating and re-executing steps on the change sub group to locate a change in the modified copy that caused the regression test cases to fail.

9. A computer program product for automating software code check-in in a code management system, the computer program product comprising:
a computer recordable storage device having computer usable program code tangibly embodied thereon, the computer usable program code comprising:
computer usable program code for receiving a request to check-in a modified copy of a source code file to a repository, wherein the modified copy comprises changes to the source code file located in the repository;
computer usable program code for placing the modified copy of the source code file in a quality check pending state in the repository, wherein the quality check pending state is a state in the repository in which the modified copy of the source code is maintained until the quality of the modified copy of the source code file is verified;
computer usable program code for automatically pulling the modified copy of the source code from the repository into a software delivery environment comprising a build mechanism that converts source code files into executable code and a regression test mechanism to execute regression test cases against the changes in the modified copy in response to an occurrence of a specific event or expiration of a set time period;
computer usable program code for automatically determining by the software delivery environment if the regression test cases are successful to verify the modified copy; and
computer usable program code for committing the changes in the modified copy to the source code file located in the repository in response to a determination that the regression test cases are successful.

10. The computer program product of claim 9, further comprising:
computer usable program code for preventing the modified copy from being committed to the repository in response to a determination that the regression test cases are not successful.

11. The computer program product of claim 9, further comprising:
computer usable program code for backing out the modified copy from the quality check pending state in response to a determination that the regression test cases are not successful.

12. The computer program product of claim 11, further comprising:
computer usable program code for providing notification that the regression test cases were unsuccessful.

13. The computer program product of claim 9, wherein the regression test cases automatically test the modified copy of the source code file to verify the modified copy meets a minimum level of acceptable code quality before being committed to the repository.

14. The computer program product of claim 9, wherein the computer usable program code for placing the modified copy of the source code file in a quality check pending state in the repository further comprises:
computer usable program code for performing a build process on the modified code in the software delivery environment, wherein appropriate regression test buckets are automatically triggered in the build process to test a quality of the modified code.

15. The computer program product of claim 9, wherein the computer usable program code for committing the changes in the modified copy to the source code file located in the repository further comprises:
computer usable program code for moving the modified copy from the quality check pending state to a permanent state in the repository.

16. The computer program product of claim 9, further comprising:
computer usable program code for separating the changes in the modified copy into change sub groups in response to a determination that the regression test cases are not successful;
computer usable program code for re-executing the regression test cases on each separate change sub group; and
computer usable program code for iteratively performing, in response to a determination that the re-executed regression test cases are unsuccessful against a change sub group, the separating and re-executing steps on the change sub group to locate a change in the modified copy that caused the regression test cases to fail.

17. A data processing system for automating software code check-in in a code management system, the data processing system comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to receive a request to check-in a modified copy of a source code file to a repository, wherein the modified copy comprises changes to the source code file located in the repository; place the modified copy of the source code file in a quality check pending state in the repository, wherein the quality check pending state is a state in the repository in which the modified copy of the source code is maintained until the quality of the modified copy of the source code file is verified; automatically pull the modified copy of the source code from the repository into a software delivery environment comprising a build mechanism that converts source code files into executable code and a regression test mechanism to execute regression test cases against the changes in the modified copy in response to an occurrence of a specific event or expiration of a set time period; automatically determine by the software delivery environment if the regression test cases are successful to verify the modified copy; and commit the changes in the modified copy to the source code file located in the repository in response to a determination that the regression test cases are successful.

18. The data processing system of claim 17, wherein the processing unit further executes the computer usable code to back out the modified copy from the quality check pending state in response to a determination that the regression test cases are not successful.

19. The data processing system of claim 18, wherein the processing unit further executes the computer usable code to provide notification that the regression test cases were unsuccessful.

20. The data processing system of claim 17, wherein the regression test cases automatically test the modified copy of the source code file to verify the modified copy meets a minimum level of acceptable code quality before being committed to the repository.

* * * * *